US007054126B2

(12) United States Patent
Strutt et al.

(10) Patent No.: US 7,054,126 B2
(45) Date of Patent: May 30, 2006

(54) SYSTEM AND METHOD FOR IMPROVING THE ACCURACY OF TIME OF ARRIVAL MEASUREMENTS IN A WIRELESS AD-HOC COMMUNICATIONS NETWORK

(75) Inventors: Guenael Strutt, Sanford, FL (US); John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 430 days.

(21) Appl. No.: 10/303,842

(22) Filed: Nov. 26, 2002

(65) Prior Publication Data
US 2003/0227895 A1   Dec. 11, 2003

Related U.S. Application Data

(60) Provisional application No. 60/385,562, filed on Jun. 5, 2002.

(51) Int. Cl.
    *H02H 9/00* (2006.01)
(52) U.S. Cl. .................................................. 361/119
(58) Field of Classification Search ................ 361/62, 361/64, 66, 119, 115
    See application file for complete search history.

(56) References Cited

U.S. PATENT DOCUMENTS

| | | | | |
|---|---|---|---|---|
| 4,494,192 | A | 1/1985 | Lew et al. | 364/200 |
| 4,617,656 | A | 10/1986 | Kobayashi et al. | 370/74 |
| 4,736,371 | A | 4/1988 | Tejima et al. | 370/95 |
| 4,742,357 | A | 5/1988 | Rackley | 342/457 |
| 4,747,130 | A | 5/1988 | Ho | 379/269 |
| 4,910,521 | A | 3/1990 | Mellon | 342/45 |
| 4,964,126 | A * | 10/1990 | Musicus et al. | 714/797 |
| 5,034,961 | A | 7/1991 | Adams | 375/130 |
| 5,068,916 | A | 11/1991 | Harrison et al. | 455/39 |
| 5,231,634 | A | 7/1993 | Giles et al. | 370/95.1 |
| 5,233,604 | A | 8/1993 | Ahmadi et al. | 370/60 |
| 5,241,542 | A | 8/1993 | Natarajan et al. | 370/95.3 |
| 5,317,566 | A | 5/1994 | Joshi | 370/60 |

(Continued)

FOREIGN PATENT DOCUMENTS

CA    2132180    3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Stephen W. Jackson
(74) *Attorney, Agent, or Firm*—Randi L. Karpinia; Joseph J. Buczynski

(57) ABSTRACT

A system and method for improved Time Of Arrival (TOA) distance measurements between nodes of a wireless ad-hoc network. Specifically, the present invention is a system and method of distance estimation using square-root raised-cosine pulse shaping and chip matched filters on direct sequence spreading waveforms, the multiplication of which produces raised-cosine filtered pulse responses. The responses are used to identify a time when a function is at a maximum, corresponding to the actual signal reception time. The system and method produces a raised-cosine filtered pulse response and an auto-correlation function based on a received signal. A peak value of the auto-correlation function is calculated based on a quadratic approximation, which is corrected using a signal sampling phase offset detected between the raised-cosine filtered pulse response and the calculated peak value. The calculated peak value is then corrected to represent an actual reception time for received signals.

24 Claims, 6 Drawing Sheets

U.S. PATENT DOCUMENTS

| | | | |
|---|---|---|---|
| 5,371,734 A | 12/1994 | Fischer | 370/18 |
| 5,392,450 A | 2/1995 | Nossen | 455/12.1 |
| 5,412,654 A | 5/1995 | Perkins | 370/94.1 |
| 5,424,747 A | 6/1995 | Chazelas et al. | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,953,327 A | 9/1999 | Cox | 370/336 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,269,075 B1 | 7/2001 | Tran | 370/206 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,549,594 B1 | 4/2003 | Chen et al. | 375/355 |
| 6,681,099 B1 * | 1/2004 | Keranen et al. | 455/67.16 |
| 2001/0053699 A1 | 12/2001 | McCrady et al. | 455/513 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communictaion Review.

Richard North, Dale Bryan and Dennis Baker, "Wireless Networked Radios: Comparison of Military, Commercial, and R&D Protocols", Feb. 28-Mar. 3, 1992, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control on Multihop Wireless Networks using Transmit Power Adjustment".

Ram Ramanathan and Martha E. Steenstrup, "Hierarchically-Organized, Multihop Mobile Wireless Networks for Quality-of-Service Support".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR IMPROVING THE ACCURACY OF TIME OF ARRIVAL MEASUREMENTS IN A WIRELESS AD-HOC COMMUNICATIONS NETWORK

This application claims benefit under 35 U.S.C. §119(e) from U.S. provisional patent application Ser. No. 60/385,562 entitled "A System And Method For Improving The Accuracy Of Time Of Arrival Measurements In A Wireless Ad-Hoc Communications Network", filed Jun. 5, 2002, the entire contents of which is incorporated herein by reference.

BACKGROUND OF THE INVENTION

1. Field of the Invention

The present invention relates to a system and method for improving Time Of Arrival (TOA) distance measurements between nodes of a wireless ad-hoc network. Specifically, the present invention relates to a system and method for performing distance estimation using square-root raised cosine pulse shaping and chip matched filters on direct sequence spreading waveforms, the multiplication of which produces a raised cosine filtered pulse response. The response is used to identify a time when a function is at a maximum, corresponding to the actual signal reception time.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

The mobile nodes of such networks may assume any number of random positions within the network, making exact node location determinations difficult when needed. For computing node geographical coordinates in such ad-hoc wireless networks, algorithms in use at individual nodes in typical networks use the "Time Of Arrival" (TOA) measurement technique. As can be appreciated by one skilled in the art, a TOA measurement provides the distance between mobile nodes for computing a mobile node position. The measurements are based upon signal propagation times, specifically the time a signal needs for traveling between transceivers of a target node and a reference node.

Time Of Arrival (TOA) measurements provide an estimate of the distance between two transceivers, or nodes. In order to perform high precision computations for mobile node location services, it is necessary to measure the distance between two transceivers with a high degree of precision. One technique used to estimate the distance between two transceivers is based on the computation of the auto-correlation function of a spreading sequence, and only yields a precision of ±0.5 Tc (where Tc is the chip rate) or ±4.68 meters (for a chip rate of 32 Mcps).

Profile estimations may also be achieved using a quadratic function. For instance, the multipath profile of a radio frequency (RF) signal can be approximated using a quadratic function and multiple signal measurements. As described in U.S. Pat. No. 6,269,075 to Tran, the entire content of which is incorporated herein by reference, the peak of the quadratic function, corresponding to the multipath with the peak signal strength, can be found through a simple derivation. However, as further detailed in the Tran Patent, non-quadratic shapes can require a correction curve derived from actual profile information, from which an estimated timing offset can be calculated. However, Tran fails to disclose that the multipath profile of the RF signal is related to the pulse-shaping filters used in the transceiver, and that this property can be used to determine the actual correction to apply.

Accordingly, a need exists for a system and method to provide an accurate estimate of a signal time of arrival and timing offset correction for non-quadratic signal profiles using pulse-shaping filter outputs in order to perform high precision computations for mobile unit location services.

SUMMARY OF THE INVENTION

An object of the present invention is to provide a system and method to improve the accuracy of TOA measurements in an ad-hoc communications network.

Another object of the present invention is to provide a system and method to apply a square-root raised-cosine pulse shaping and chip matched filter to a direct sequence spreading waveform to produce a raised-cosine filtered pulse response.

Another object of the present invention is to provide a system and method to calculate an auto-correlation function based on raised-cosine filtered pulse responses and calculating a peak value using a quadratic approximation technique.

Another object of the present invention is to provide a system and method to calculate a sampling phase offset to allow correction of a peak value representing the peak value for the generated raised-cosine filtered pulse response.

Another object of the present invention is to provide a system and method to correct the peak value determined to represent actual signal reception time for use in improved TOA measurements.

These and other objects are substantially achieved by a system and method for improved Time Of Arrival (TOA) distance measurements between nodes of a wireless ad-hoc network. The present system and method establishes highly accurate distance estimations using square-root raised-cosine pulse shaping and chip matched filters on direct sequence spreading waveforms, the multiplication of which produces raised-cosine filtered pulse responses. The responses are used to identify a time when a function is at a maximum, corresponding to the actual signal reception time.

The system and method produces a raised-cosine filtered pulse response and an auto-correlation function based on a received signal. A peak value of the auto-correlation function is calculated based on a quadratic approximation, which is corrected using a signal sampling phase offset detected between the raised-cosine filtered pulse response and the calculated peak value. The calculated peak value is then corrected to represent an actual reception time for received signals for use in accurate distance estimations for signal propagation.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
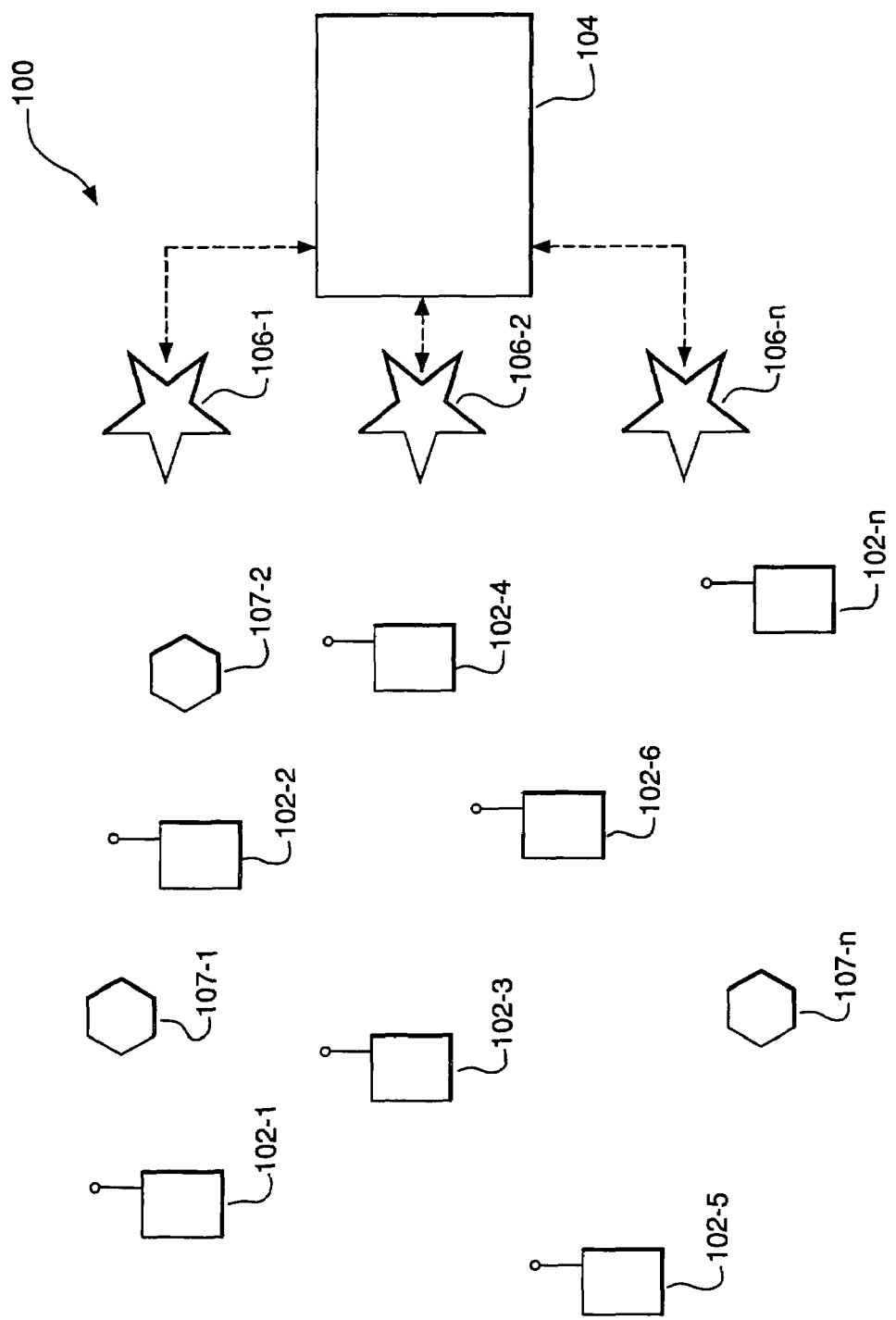
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-$n$ (referred to generally as nodes 102 or mobile nodes 102), and can, but is not required to, include a fixed network 104 having a plurality of access points 106-1, 106-2, . . . 106-$n$ (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-$n$ (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. patent application Ser. Nos. 09/897,790, 09/815,157 and 09/815,164, referenced above.

Figure 2:
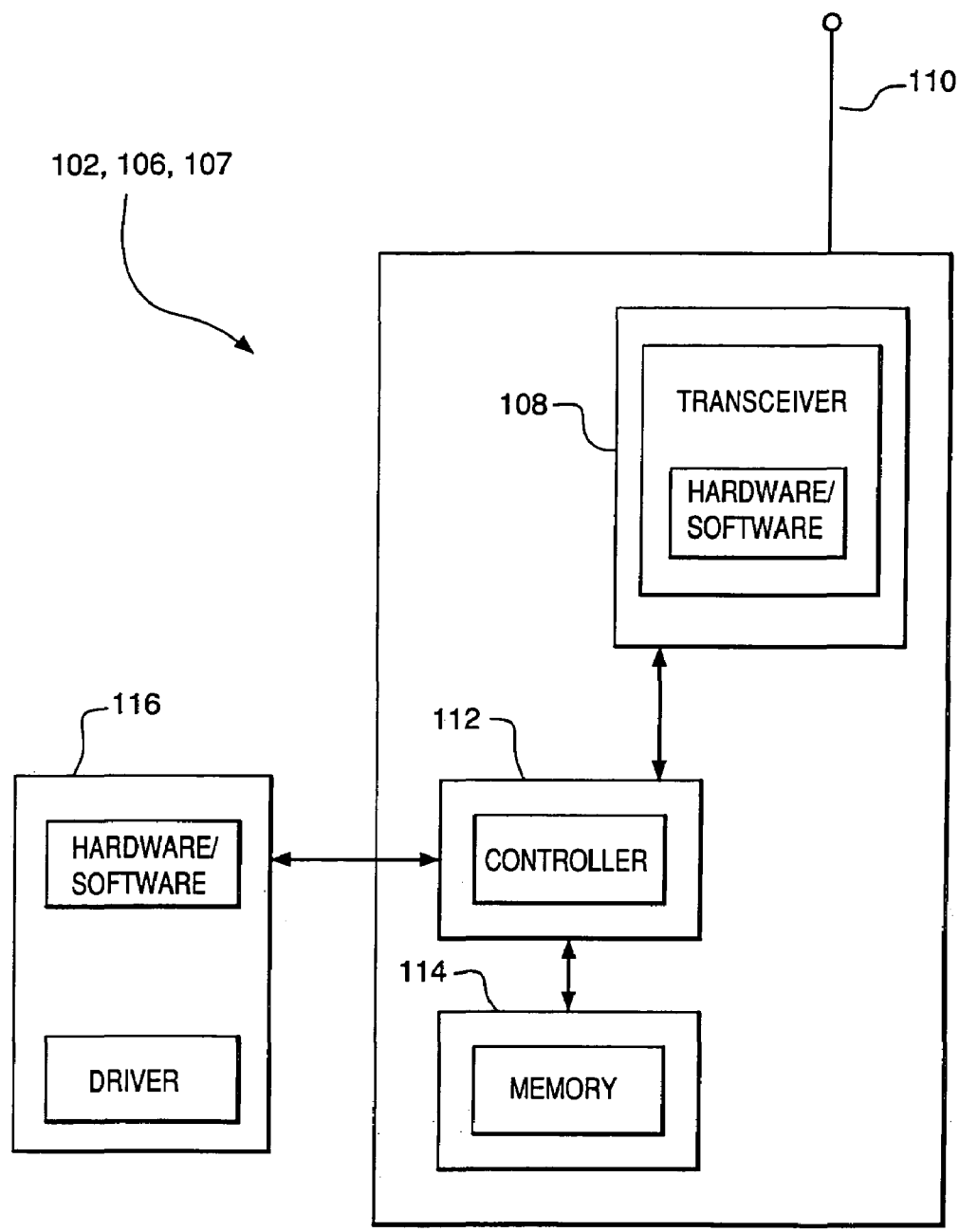
FIG. 2 is a block diagram illustrating an example of a mobile node employed in the network shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 periodically exchange their respective routing information, referred to as routing advertisements or routing table information, with each other via a broadcasting mechanism, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform Time Of Arrival (TOA) calculations, as set forth in greater detail below.

As stated earlier, mobile nodes 102 of such networks may assume any number of random positions within the network, making exact node location determinations difficult when needed. In order for nodes 102, 106 and 107 to ascertain each others locations, a Time Of Arrival measurement can be used to provide an estimate of the distance between the two transceivers of a first and second node. In order to perform high precision computations for mobile node location services, it is necessary to measure the distance between the two transceivers with a high degree of precision. The embodiment of the present invention described below uses three values of a raised-cosine-filtered pulse response to identify the time when a function is at it's maximum by determining the autocorrelation peak location with subchip resolution. The calculated time value corresponds to the actual reception time and can be estimated with a high degree of precision.

The embodiment of the present invention uses a square-root raised-cosine pulse shaping and chip matched filter on the direct sequence spreading waveform, the multiplication of which, results in a raised cosine filtered pulse response. Using three values of the raised-cosine-filtered pulse response, the time when the function is at it's maximum value can be calculated by determining the auto-correlation peak location with subchip resolution. This time corresponds to the actual reception time and can be estimated with a high degree of precision, which can then be used to determine the distance between the receiving node and transmitting node. As described below, the receiving node 102, 106 or 107 can use this information, along with additional measurements to determine the location of the transmitting node 102, 106 or 107. Also, as can be appreciated by one skilled in the art, the calculations described below can be performed by the controller 112 of the receiving node 102, 106 or 107, or by any other suitable component.

Figure 3:
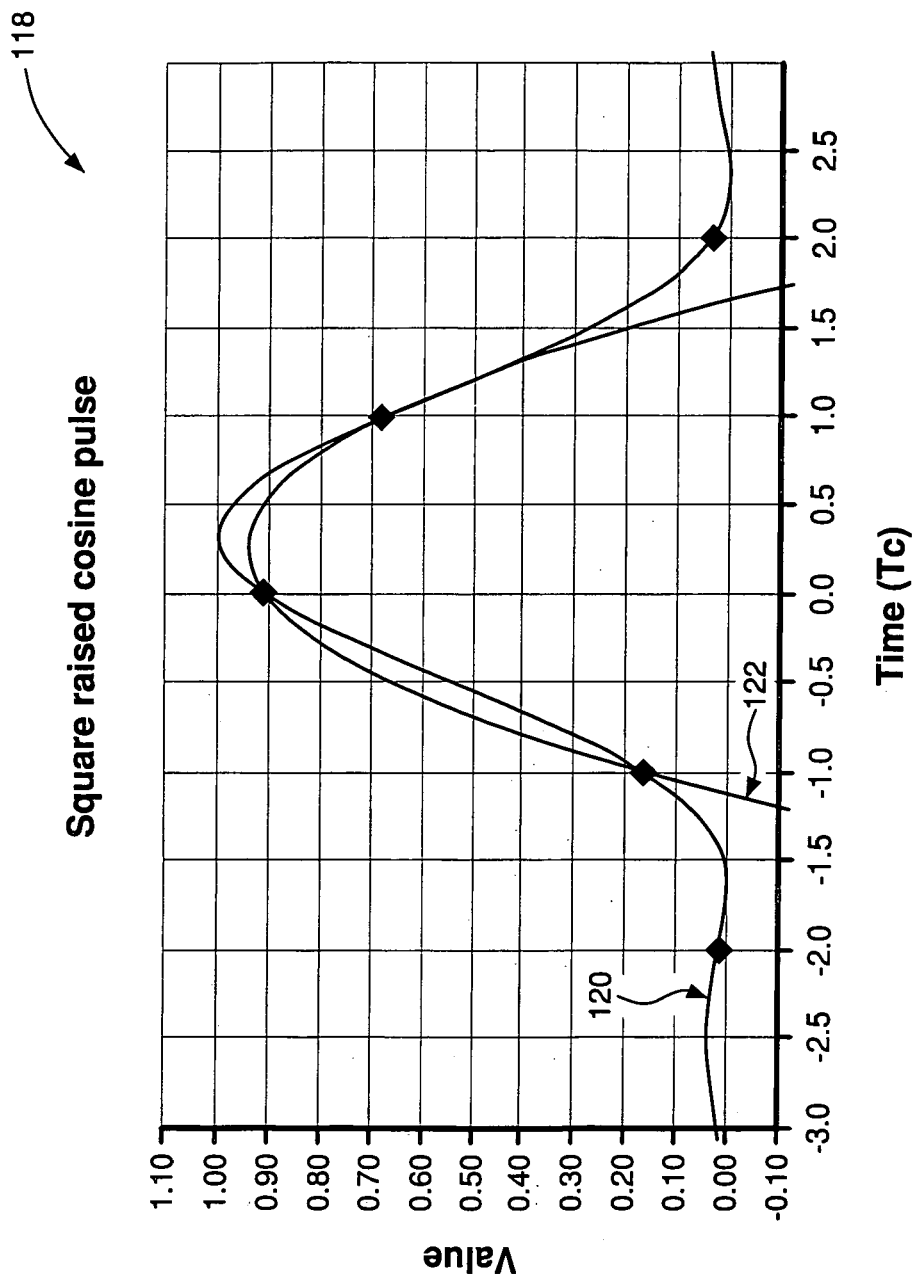
FIG. 3 shows an example of a correlation function performed by a node in the network shown in FIG. 1 in accordance with an embodiment of the present invention.

The embodiment of the present invention described below can be used to determine the sampling phase offset in a communication system such as shown in FIG. 1, measuring sampling delays with a resolution which is an order of magnitude larger than the sampling time. As noted above, the embodiment of the present invention uses a square-root raised-cosine pulse shaping and chip matched filter on the direct sequence spreading waveform to produce a raised-cosine-filtered pulse response. The chip sequence is convolved with the square-root raised cosine function, and the superposed multiplication of each square-root raised cosine function yields a raised-cosine function. This response can be represented by the following equation (1) and an example is shown as plot 120 in graph 118 of FIG. 3, $$p_{RC}(t) = \left[ \frac{\cos\left(\pi\alpha\left[\frac{t}{2T_c}\right]\right)}{\left(1 - \left[2\alpha\left(\frac{t}{2T_c}\right)\right]^2\right)} \frac{\sin\left(\pi\left(\frac{t}{2T_c}\right)\right)}{\left(\pi\left(\frac{t}{2T_c}\right)\right)} \right]^2 \quad (1)$$

where, in this example, $T_C$ is the chip period of 31.25 ns (chip rate=32 Mcps) and α is the alpha filter parameter equal to 0.23. FIG. 3 shows an example of a correlation function performed by a node in the network shown in FIG. 1 in accordance with an embodiment of the present invention.

Once the raised-cosine-filtered pulse response is determined, a quadratic approximation of the function, shown as plot 122 in graph 118 in FIG. 3, is a simple method to identify the peak of the auto-correlation function of equation (1). The profile can be approximated using the quadratic equation (2):

$$Y = A(t^2) + B(t) + C \quad (2)$$

The peak of the quadratic form defined by three equidistant points on the plot is presented in equation (3):

$$\delta = -\frac{1}{2} \frac{y_+ - y_-}{y_+ + y_- - 2y_0} \quad (3)$$

where $y_0$, $y_+$ and $y_-$ are three successive values generated by the autocorrelation function when receiving three consecutive chips. The values are selected such that $y_0 > y_+$ and $y_0 > y_-$.

The time when the chip generates value $y_0$ is considered the Time Of Arrival with the resolution of one chip (32.125 ns). For identifying the moment within that chip when the autocorrelation function has it's maximum value, three values are used for computing the coefficients A, B, and C of the parabolic function presented in equation (2). The maximum value of the parabolic function is at time $-\frac{1}{2} B/A$, when a function derivative is zero. The equation (3) is obtained by replacing A and B in equation (2) with the corresponding expressions using $y_0$, $y_+$ and $y_-$. The value of δ so computed is the difference between the time when the middle of the chip that provided $y_0$ was received and the time when the parabolic function has it's maximum. It is then a fraction of the chip duration of 32.125 ns and is applied as a correction to the Time Of Arrival.

Figure 4:
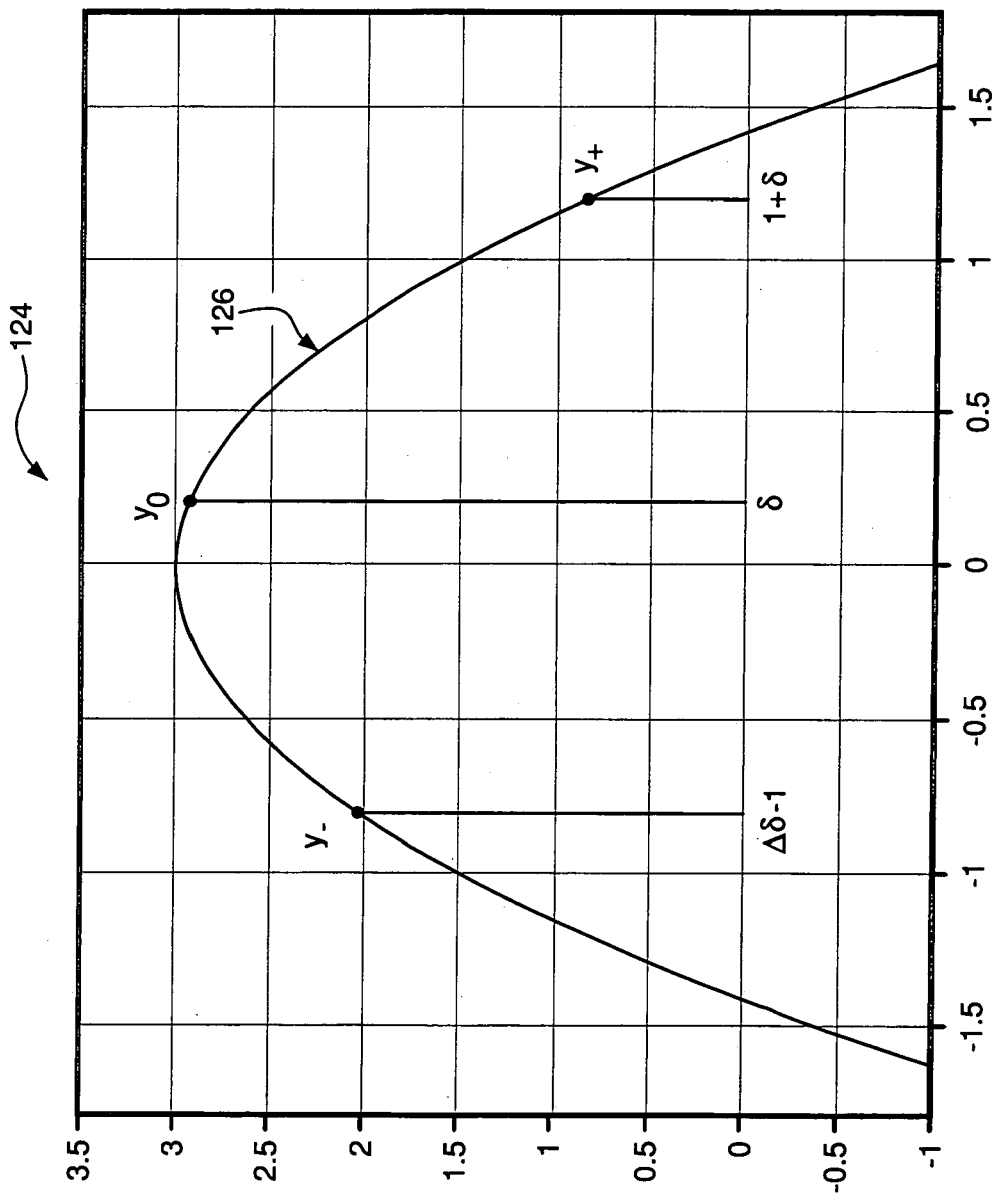
FIG. 4 shows an example of a relationship between δ and actual delay in accordance with an embodiment of the present invention.

Graph 124 of FIG. 4 shows the relationship between δ (Δ on the graph) and the actual delay (embodied by the origin "0") in a quadratic approximation in accordance with an embodiment of the present invention. If the curve 126 of FIG. 4, whether it be the quadratic approximation or the real raised-cosine function, is sampled properly, then $y_-$, $y_0$ and $y_+$ are at point $-1+\delta$, $0+\delta$ and $1+\delta$, which are sampling delays, not time values. To calculate the time value, the sampling delay can be multiplied by the sampling interval $T_c$, which is 31.25 ns in this example. Since sampling of $y_0$ can occur anywhere between $-0.5$ and $+0.5$ $T_c$, it is necessary to estimate the delay between the "actual" peak at point 0 and the "sampled" peak at point δ.

Returning to FIG. 3, graph 118 shows the correlation function and the associated quadratic approximation on a single graph, illustrating a square-root raised cosine pulse plot 120 and a quadratic approximation plot 122. Since the square-root raised cosine pulse shaping function 120 is not a quadratic form (i.e. function 120 does not match the approximation 122 in FIG. 3), δ is systematically shifted away from its expected value (as illustrated in FIG. 4). The corrected value δ' provides a much better approximation of the auto-correlation peak (i.e. the peak of the square-root raised cosine pulse 120).

The sampling phase offset that is determined by equation (4) is used to measure time-of-flight measurement with significantly better accuracy:

$$\delta' = \delta(1.5694 - 1.1449|\delta|) \quad (4)$$

wherein δ represents the peak offset of the quadratic approximation, and δ' represents the extra offset required to bring δ to the actual peak value due to the square-root raised cosine pulse shaping function being slightly off the approximation. The value of δ is an approximation of the peak, while δ' is an improvement compensating for the systematic error. The coefficients of this correction are empirically computed to minimize the error on peak determination.

Figure 5:
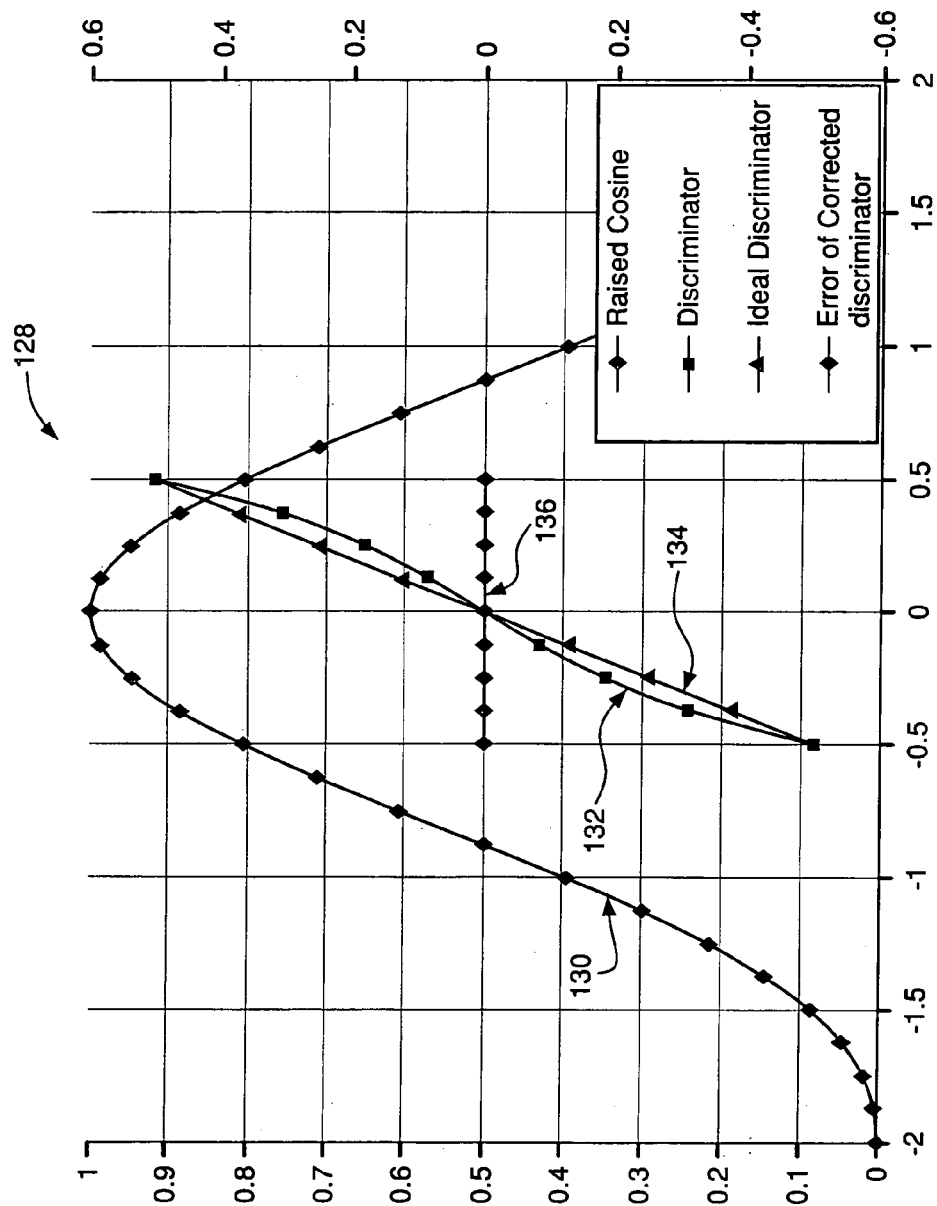
FIG. 5 shows an example of an approximation process performed by a node in the network shown in FIG. 1 in accordance with an embodiment of the present invention.

FIG. 5 provides an illustration of the approximation process. The quadratic function and the pulse-shaping function of FIG. 3 are clearly different, indicating that an error is added to the estimation of δ while using equation (3). This error is visible on the graph 128 of FIG. 5 and becomes quite large as sampling occurs more and more off-chip (i.e. the fractional chip delay is closer to $-0.5T_c$ or $+0.5T_c$). The correction equation (4) is designed to minimize the error between an ideal discriminator, plot 134, that tells exactly what the delay is and a rough, easy-to-compute discriminator, plot 132, such as the one used in equation (3). The graph 128 of FIG. 5 shows the raised cosine function 130 (measured along left scale of 128), the computed discriminator 132, the ideal discriminator 134 and the difference between the corrected discriminator and the ideal discriminator 136 (measured along right scale of 128). In this chart the difference between ideal and corrected discriminators is an almost horizontal line, as it's absolute value is always smaller than 0.001.

As noted above, time-of-flight, or signal propagation time between mobile nodes 102, may be used for computing the mobile node position using Time Of Arrival techniques. The measurement accuracy is improved significantly using the embodiment described above. For example, if the propagation of an electromagnetic waveform at a signaling rate of 32 Mcps is considered, every half-chip error in timing measurement yields an error of about 5 meters in the estimation of the distance between two transceivers, notwithstanding errors associated with signal corruption. By estimating the chip-delay from equation (3), and applying the correction value of equation (4) in accordance with the embodiment of the present invention, an error value may be computed and illustrated in a simulation shown in FIG. 6.

Figure 6:
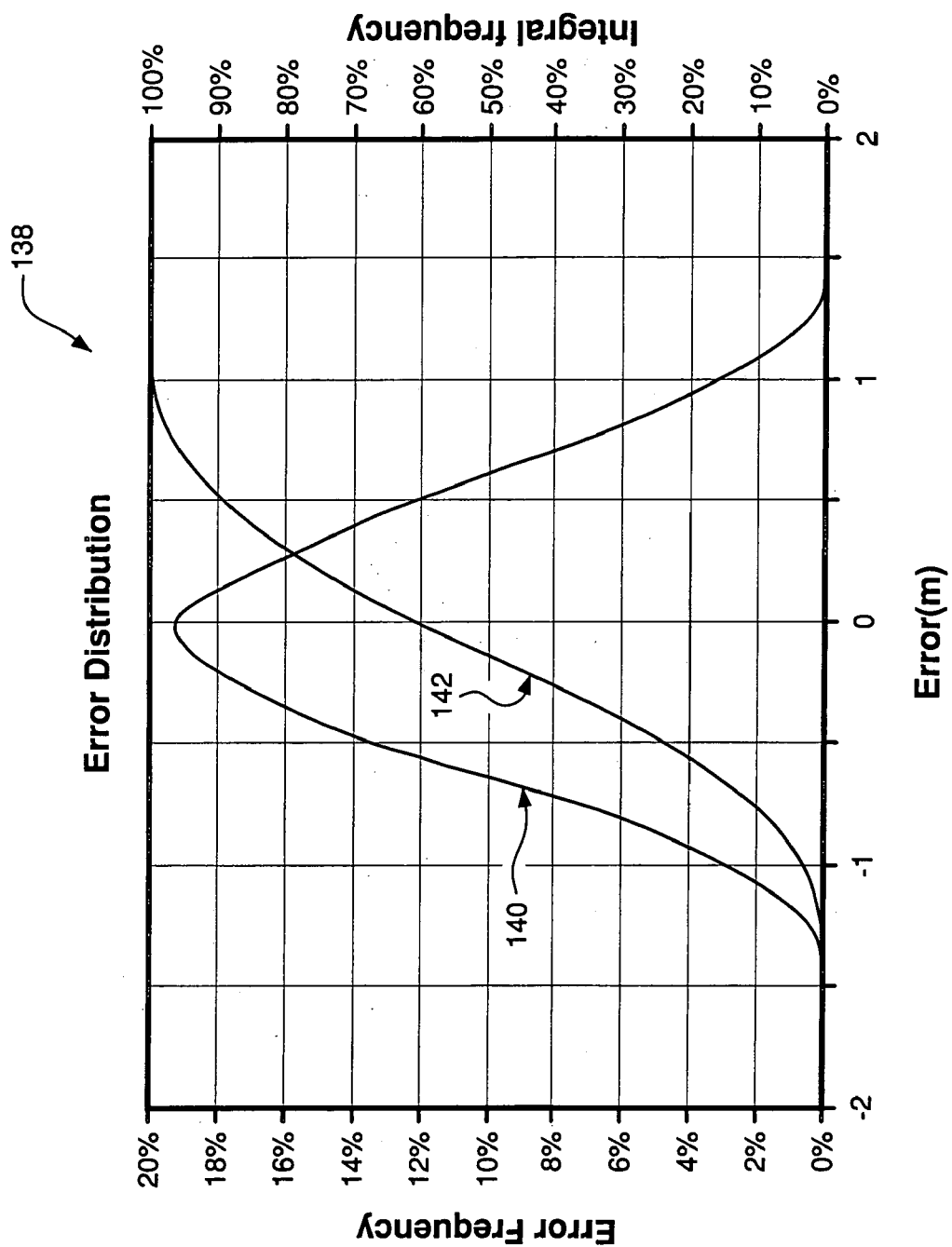
FIG. 6 shows an example of an error distribution plot realized by performing the correlation function shown in FIG. 3 in accordance with an embodiment of the present invention.

FIG. 6 shows the distribution of errors for 3000 measurements of the correlation function affected by random errors of ±0.1 units in graph 138. In graph 138, plot 140 represents the normal error frequency density function of an error having a value of "x" meters. The area under the distribution is equal to 1, therefore the normal distribution shown by plot 140 is a probability distribution. The mean (μ) of plot 140 is 0.0 meters, and the standard deviation (σ) is 0.5 meters.

As known to those skilled in the art, approximately 70% of the population of plot 140 falls between μ+/−1σ, and approximately 99% of the population of plot 140 falls between μ+/−2σ. Therefore, graph 138 shows that 70% of measurements were affected by errors smaller than 0.5 meters, and 99% of measurements were affected by errors smaller than 1.0 meters.

Plot 142 represents the normal cumulative distribution function of the plot 142. The function defines the probability the error is less than or equal to some value "x". As shown in graph 138, no measurement was more than +/−1.5 meters away from the correct value.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method to determine signal propagation time between nodes in an ad-hoc communications network, said nodes being adapted to transmit and receive signals to and from other nodes in said ad-hoc network, the method comprising:

controlling a first node of said plurality to receive at least one signal communicated from a second node, and to calculate a response based on said signal;

controlling said first node to calculate an auto-correlation function of said response, and to calculate an approximate peak value of a quadratic approximation based on said auto-correlation function;

controlling said first node to determine a signal sampling phase offset between said response and said approximate peak value and in response, to calculate an actual peak value of said response; and controlling said first node to calculate an actual reception time for said at least one signal at said first node based on said actual peak value, and to determine, based on said actual reception time, a signal propagation time.

2. A method as claimed in claim 1, further comprising:

controlling said first node to calculate said response based on an application of a square-root raised-cosine pulse shaping and chip-matched filter on a direct sequence spreading waveform of said signal to produce at least one square-root raised cosine function.

3. A method as claimed in claim 2, wherein:

said response comprises a superposed multiplication of each said square-root raised cosine function.

4. A method as claimed in claim 1, further comprising: controlling said first node to calculate said auto-correlation function of said response wherein said auto-correlation function is based on the following equation:

$$p_{RC}(t) = \left[ \frac{\cos\left(\pi\alpha\left[\frac{t}{2T_c}\right]\right)}{\left(1 - \left[2\alpha\left(\frac{t}{2T_c}\right)\right]^2\right)} \frac{\sin\left(\pi\left(\frac{t}{2T_c}\right)\right)}{\left(\pi\left(\frac{t}{2T_c}\right)\right)} \right]^2$$

wherein $T_c$ is a chip period value and $\alpha$ is an alpha filter parameter.

5. A method as claimed in claim 1, further comprising:

controlling said first node to calculate said approximate peak value of said quadratic approximation wherein said quadratic approximation is based on the following equation:

$Y = A(t^2) + B(t) + C$.

6. A method as claimed in claim 1, further comprising:

controlling said first node to calculate said approximate peak value of said quadratic approximation wherein said approximate peak value is based on the following equation:

$$\delta = -\frac{1}{2}\left(\frac{y_+ - y_-}{y_+ + y_- - 2y_0}\right)$$

wherein $y_-$, $y_+$ and $Y_0$ are a first, second and third equidistant point located on said quadratic approximation.

7. A method as claimed in claim 1, further comprising:

controlling said first node to calculate said sampling phase offset wherein said sampling phase offset is based on the following equation:

$\delta' = \delta(a - b|\delta|)$ wherein $\delta$ is said approximate peak value of said quadratic approximation, and $\delta'$ is said sampling phase offset; and controlling said first node to calculate said actual peak value of response based on said approximate peak value and said sampling phase offset.

8. A system to determine signal propagation time between nodes in an ad-hoc communications network, said nodes being adapted to transmit and receive signals to and from other nodes in said ad-hoc network, the system comprising:

a controller, adapted to control a first node of said plurality to receive at least one signal communicated from a second node, and to calculate a response based on said signal;

said controller being further adapted to control said first node to calculate an auto-correlation function of said response, and to calculate an approximate peak value of a quadratic approximation based on said auto-correlation function;

said controller being further adapted to control said first node to determine a signal sampling phase offset between said response and said approximate peak value and in response, to calculate an actual peak value of said response; and said controller being further adapted to control said first node to calculate an actual reception time for said at least one signal at said first node based on said actual peak value, and to determine, based on said actual reception time, a signal propagation time.

9. A system as claimed in claim 8, wherein: said controller is adapted to control said first node to calculate said response based on an application of a square-root raised-cosine pulse shaping and chip-matched filter on a direct sequence spreading waveform of said signal to produce at least one square-root raised cosine function.

10. A system as claimed in claim 9, wherein:
said response comprises a superposed multiplication of each said square-root raised cosine function.

11. A system as claimed in claim 8, wherein:
said controller is adapted to control said first node to calculate said auto-correlation function of said response wherein said auto-correlation function is based on the following equation:

$$p_{RC}(t) = \left[ \frac{\cos\left(\pi\alpha\left[\frac{t}{2T_c}\right]\right)}{\left(1 - \left[2\alpha\left(\frac{t}{2T_c}\right)\right]^2\right)} \frac{\sin\left(\pi\left(\frac{t}{2T_c}\right)\right)}{\left(\pi\left(\frac{t}{2T_c}\right)\right)} \right]^2$$

wherein $T_c$ is a chip period value and $\alpha$ is an alpha filter parameter.

12. A system as claimed in claim 8, wherein:
said controller is adapted to control said first node to calculate said approximate peak value of said quadratic approximation wherein said quadratic approximation is based on the following equation:

$Y = A(t^2) + B(t) + C.$

13. A system as claimed in claim 8, wherein:
said controller is adapted to control said first node to calculate said approximate peak value of said quadratic approximation wherein said approximate peak value is based on the following equation:

$$\delta = -\frac{1}{2}\left(\frac{y_+ - y_-}{y_+ + y_- - 2y_0}\right)$$

wherein $y_-$, $y_+$ and $y_0$ are a first, second and third equidistant point located on said quadratic approximation.

14. A system as claimed in claim 8, wherein:
said controller is adapted to control said first node to calculate said sampling phase offset wherein said sampling phase offset is based on the following equation:

$\delta' = \delta(a - b|\delta|)$ wherein $\delta$ is said approximate peak value of said quadratic approximation, and $\delta'$ is said sampling phase offset; and controlling said first node to calculate said actual peak value of said response based on said approximate peak value and said sampling phase offset.

15. A computer-readable medium of instructions, adapted to determine signal propagation time between nodes in an ad-hoc communications network, said nodes being adapted to transmit and receive signals to and from other nodes in said ad-hoc network, comprising:

a first set of instructions, adapted to control a first node of said plurality to receive at least one signal communicated from a second node, and to calculate a response based on said signal;

a second set of instructions, adapted to control said first node to calculate an auto-correlation function of said response, and to calculate an approximate peak value of a quadratic approximation based on said auto-correlation function;

a third set of instructions, adapted to control said first node to determine a signal sampling phase offset between said response and said approximate peak value and in response, to calculate an actual peak value of response; and a fourth set of instructions, adapted to control said first node to calculate an actual reception time for said at least one signal at said first node based on said actual peak value, and to determine a signal propagation time based on said actual reception time.

16. A computer-readable medium of instructions as claimed in claim 15, wherein:
said first set of instructions is adapted to control said first node to calculate said response based on an application of a square-root raised-cosine pulse shaping and chip-matched filter on a direct sequence spreading waveform of said signal to produce at least one square-root raised cosine function.

17. A computer-readable medium of instructions as claimed in claim 16, wherein:
said response comprises a superposed multiplication of each said square-root raised cosine function.

18. A computer-readable medium of instructions as claimed in claim 15, wherein:
said second set of instructions is adapted to control said first node to calculate said auto-correlation function of said response wherein said auto-correlation function is based on the following equation:

$$p_{RC}(t) = \left[ \frac{\cos\left(\pi\alpha\left[\frac{t}{2T_c}\right]\right)}{\left(1 - \left[2\alpha\left(\frac{t}{2T_c}\right)\right]^2\right)} \frac{\sin\left(\pi\left(\frac{t}{2T_c}\right)\right)}{\left(\pi\left(\frac{t}{2T_c}\right)\right)} \right]^2$$

wherein $T_c$ is a chip period value and $\alpha$ is an alpha filter parameter.

19. A computer-readable medium of instructions as claimed in claim 15, wherein:
said second set of instructions is adapted to control said first node to calculate said approximate peak value of said quadratic approximation wherein said quadratic approximation is based on the following equation:

$Y = A(t^2) + B(t) + C.$

20. A computer-readable medium of instructions as claimed in claim 15, wherein:
said second set of instructions is adapted to control said first node to calculate said approximate peak value of said quadratic approximation wherein said approximate peak value is based on the following equation:

$$\delta = -\frac{1}{2}\left(\frac{y_+ - y_-}{y_+ + y_- - 2y_0}\right)$$

wherein $y_-$, $y_+$ and $Y_0$ are a first, second and third equidistant point located on said quadratic approximation.

21. A computer-readable medium of instructions as claimed in claim 15, wherein:
said third set of instructions is adapted to control said first node to calculate said sampling phase offset wherein said sampling phase offset is based on the following equation:

$$\delta' = \delta(a - b|\delta|)$$

wherein $\delta$ is said approximate peak value of said quadratic approximation, and $\delta'$ is said sampling phase offset; and
said third set of instructions being further adapted to control said first node to calculate said actual peak value of said response based on said approximate peak value and said sampling phase offset.

22. A method as claimed in claim 1, wherein said response is a raised-cosine filtered pulse response.

23. A system as claimed in claim 8, wherein said response is a raised-cosine filtered pulse response.

24. A computer-readable medium of instructions as claimed in claim 15, wherein said response is a raised-cosine filtered pulse response.

* * * * *